(No Model.) 4 Sheets—Sheet 1.

W. HENDERSON.
MACHINE FOR SEPARATING SEED FROM LINT OR FIBER.

No. 560,499. Patented May 19, 1896.

Witnesses.
H. van Oldenneel
C. A. Scott

Inventor.
William Henderson
by Richardson
Attorneys (No Model.) 4 Sheets—Sheet 2.
W. HENDERSON.
MACHINE FOR SEPARATING SEED FROM LINT OR FIBER.
No. 560,499. Patented May 19, 1896.

Witnesses.
H. van Oldenmeel
E. A. Scott.

Inventor.
William Henderson
by Richard R
Attorneys (No Model.)  4 Sheets—Sheet 3.
W. HENDERSON.
MACHINE FOR SEPARATING SEED FROM LINT OR FIBER.
No. 560,499. Patented May 19, 1896.

Witnesses.
Inventor.
William Henderson (No Model.) 4 Sheets—Sheet 4.
W. HENDERSON.
MACHINE FOR SEPARATING SEED FROM LINT OR FIBER.
No. 560,499. Patented May 19, 1896.
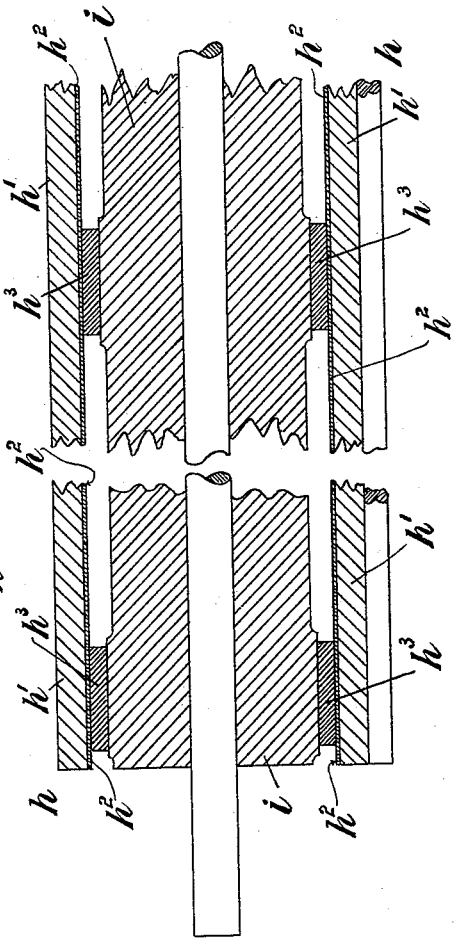
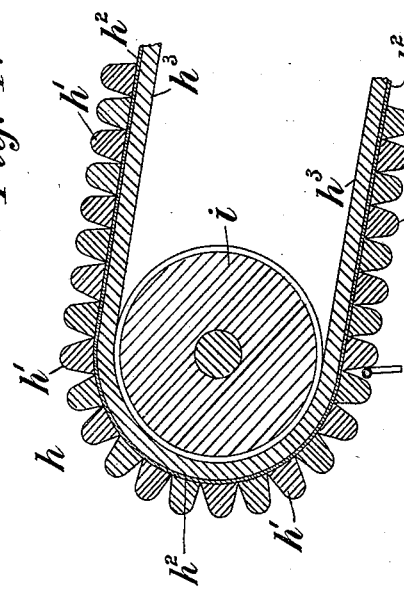

United States Patent Office.

WILLIAM HENDERSON, OF TRANMERE, ENGLAND, ASSIGNOR TO JAMES BIBBY AND JOSEPH BIBBY, OF LIVERPOOL, ENGLAND.

MACHINE FOR SEPARATING SEED FROM LINT OR FIBER.

SPECIFICATION forming part of Letters Patent No. 560,499, dated May 19, 1896.

Application filed October 8, 1895. Serial No. 565,093. (No model.)

*To all whom it may concern:*

Be it known that I, WILLIAM HENDERSON, a subject of the Queen of Great Britain and Ireland, residing at Higher Tranmere, in the county of Chester, England, have invented new and useful Improvements in Machines for Separating Seed from Lint or Fiber, of which the following is a specification.

This invention has for its object the separation from the fiber or lint resulting from the process of cleaning cotton-seed in cotton-seed cleaners of the granulated or broken seed or whole seed which pass away with the lint or fiber, and it has reference more particularly to cases where there is produced in and delivered from a machine fiber or lint in a short state with more or less broken seed, and sometimes some whole seed.

The invention is illustrated by the accompanying drawings, and the type of cotton-seed-cleaning machine therein shown is that in which along the side of a horizontal fixed barrel there are openings for its full length or at intervals along it through which the removed fiber or lint and the said granular matters pass, and besides this in this machine there are saws working in connection with these openings by which the removed lint or fiber is withdrawn from within the machine.

Figure 1:
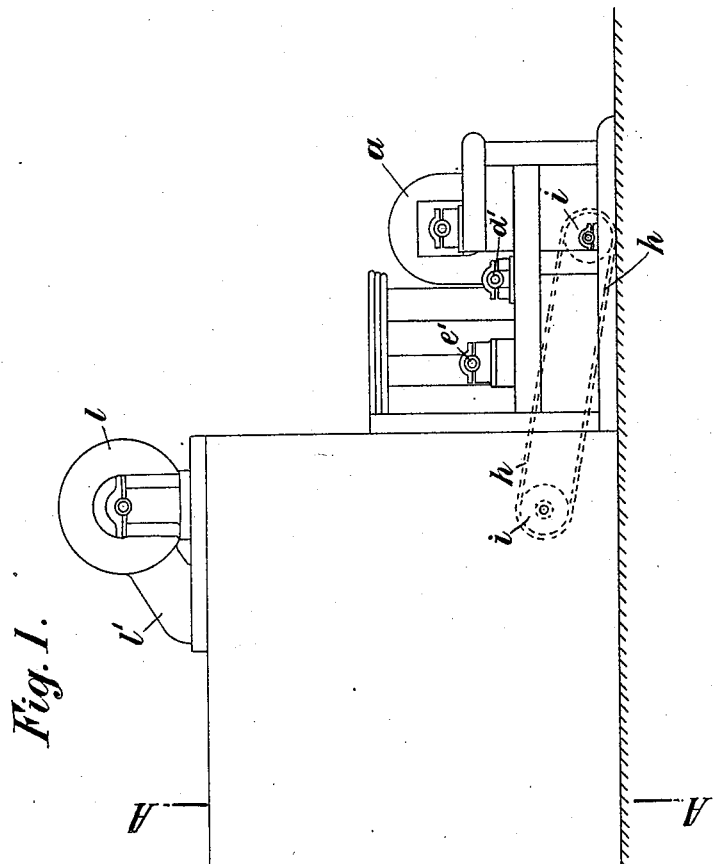
Figure 2:
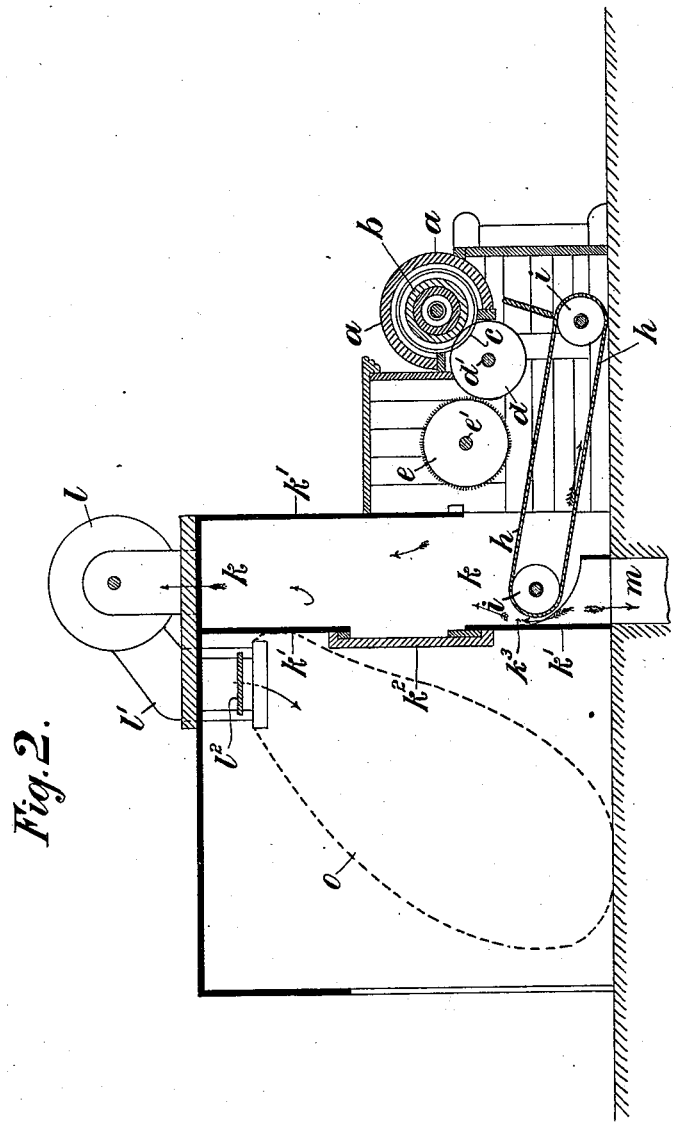
Figure 3:
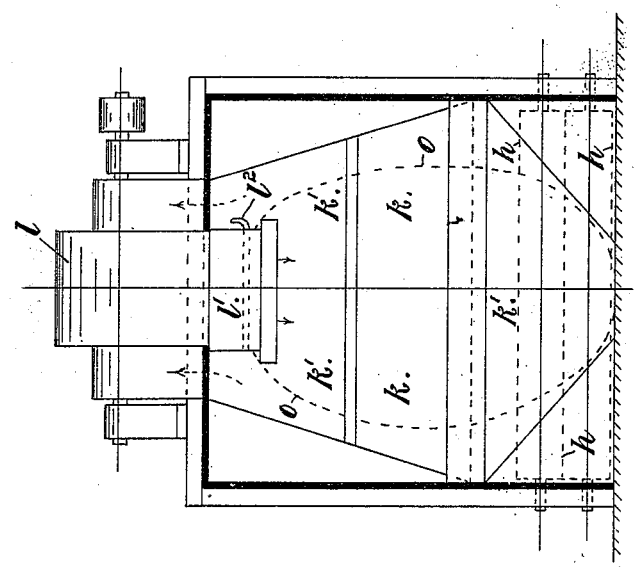

In the drawings, Figure 1 is an outside elevation showing a machine or apparatus according to this invention. Fig. 2 is a sectional elevation of the machine. Fig. 3 is a cross-section taken at the line A A, Fig. 1; and Figs. 4 and 5 are details showing parts of the apparatus to an enlarged scale.

It is found in the practice of cleaning or delinting cotton-seed that the granulated seed and whole seed, if any, which are discharged with the removed short fiber or lint from a cotton-seed cleaning-machine are very difficult of separation and removal from the such short fiber and lint, especially so when the lint or fiber and the seed have been allowed to fall and settle in a chamber or under like conditions, and, moreover, the attempts hitherto made in separating them have been so costly as to render the granulated or whole seed recovered of little or no more value than the cost of recovery. Now according to this invention the mixed short fiber and granulated seed are first deposited as they are discharged directly onto a moving conveyer and taken thereby from the point of deposit and then subsequently subjected to the action of a current of air, by which the short fiber or lint is carried away with the air and so separated from the heavier particles of seed. By this method the direct, simple, and effective separation of the matters discharged from a cotton-seed cleaner is performed. To render the separating action the more simple and effective, a partial separation is effected in the depositing on the conveyer. This is done by constructing the conveyer-surface partly of one level and partly of another, (a lower one,) and this differential level is conveniently provided by making the conveyer of bars or ribs set closely together with spaces or recesses between them, into which spaces the granular material falls while the lint or fiber rests mostly on the ribs, bars, or the parts of them which stand above the recesses into which the granular matters or seed fall.

Referring now to the drawings illustrating the invention, the main characteristics of which are just described, $a$ designates generally the stationary barrel or casing of a horizontal type of cotton-seed cleaner of any known suitable type, and $b$ is an inner rotating cylinder. In the outer case $a$ along its whole length, or at intervals along it, grid-bars $c$ are provided, between which saws $d$, mounted on shaft $d'$, pass, and by the revolution of which the lint or fiber removed from the seed is taken from the interior of the machine. In connection with these saws revolving brushes $e$, the shaft $e'$ of which is parallel with the saws $d$, are provided for removing from the saws any fiber or lint that may adhere to them.

$h$ is an endless conveyer, the details of construction of which are shown in Figs. 4 and 5, such conveyer being disposed under the openings in the case $a$, saws $d$, and brushes $e$. The conveyer is carried by and runs over pulleys $i$, the shaft of which is revolved from outside the machine. The rate of movement of the conveyer is slow—say a few feet a minute—that is, it is moved at such a rate as will cause only a thin deposit of fiber or lint upon it.

The conveyer $h$, the details of which are shown in Figs. 4 and 5, consists of wooden bars $h'$, a continuous band of canvas $h^2$, and bands $h^3$—say of leather or cotton—the canvas being screwed to the wooden strips $h'$ and the bands $h^3$ fastened to the canvas $h^2$. At the outer end of the conveyer $h$ a chamber $k$ is provided, of which $k'$ are the side walls, and on the outer wall a door $k^2$ is provided. On the top of this chamber is an exhausting-fan $l$ for creating a rarefaction within the chamber $k$, the fan having a discharge-spout $l'$ with a valve $l^2$ on it, onto which a sack $o$ can be placed.

In action the short lint or fiber and granular matters and seed which are removed from the cotton-seed cleaner by the saws $d$, and which fall from it, fall together onto the traveling conveyer $h$. The rate of movement of the conveyer is such that only a thin and evenly-distributed layer or small quantity of the matters will rest on any one part of it. As the matters fall upon the conveyer the granular portions, as broken seed and whole seed, if any, find their way into the spaces between the bars $h'$, while the lint or fiber remains mostly on the bars $h'$ and above the granular parts. Thus the two different kinds of materials or matters are partially separated—that is, they lie in layers or laminæ upon the conveyer. In this condition they are conveyed as far as the outer roller $i$ to the chamber $k$, in which the roller $i$ is placed and works. As the conveyer moves over this pulley $i$ it tends to discharge the materials upon it down through the channel $k^3$, between the conveyer and the outer wall $k'$ of the chamber $k$; but by the current of air flowing up through this channel, due to the exhausting action of the fan $l$, the fiber or lint will be wholly carried up off the bars $h'$, while the granular and heavier matters lying between the bars $h'$ will fall down against the current of air, they being partially carried past the more intense portion of the current, as they are shielded somewhat from the current at this part by the bars $h'$. The light and the heavier matters are thus separated. The granular and heavy matters fall down and are collected or conducted away by a chute $m$, and the fiber or lint is carried away upon the current of air into the fan $l$, from which it is discharged through its discharge-spout $l'$ into the bag $o$. This bag being of loose texture the air blown into it passes through it, but the lint or fiber is retained in it, and thus the necessity of a settling-chamber to collect it is obviated.

What is claimed in respect of this invention is—

1. In combination, the clearing-cylinder, a conveyer arranged to receive the material therefrom, said conveyer having platforms of different levels to hold the lint on the upper levels and to protect the seed in the lower levels and an air-trunk into which the conveyer projects and means for creating a vertical blast of air across the end of the conveyer to take off from the upper levels the lint while the seed are protected from the blast in the lower levels, substantially as described.

2. In combination, the cleaning-cylinder, the conveyer having platforms of different levels and arranged to receive the material discharged from the cylinder, the air-trunk, the said conveyer projecting into the same to leave a contracted space between its end and the side of the trunk and means for producing a vertical draft in the trunk, the said upper levels of the conveyer exposing the lint to the draft in the contracted space while the lower levels protect the seed from said draft at the contracted space, substantially as described.

3. In combination, the cleaning-cylinder, the conveyer $h$ extending therefrom, the trunk $k$ into which the discharge end of the conveyer extends, means for creating a vertical draft in said trunk across the end of the conveyer, the discharge-spout from the trunk and a bag of loose texture secured thereto to permit the free passage of the air and to catch the lint substantially as described.

In testimony whereof I hereunto affix my signature in presence of two witnesses.

WILLIAM HENDERSON.

Witnesses:
ERNEST R. ROYSTON,
JOHN HINDLEY WALKER.